(12) United States Patent
Okubo et al.

(10) Patent No.: US 9,162,674 B2
(45) Date of Patent: Oct. 20, 2015

(54) DYNAMIC MAPPING OF PEDAL POSITION TO WHEEL OUTPUT DEMAND IN A HYBRID VEHICLE

(71) Applicant: FORD GLOBAL TECHNOLOGIES, LLC, Dearborn, MI (US)

(72) Inventors: Carol L. Okubo, Belleville, MI (US); Thomas S. Gee, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 169 days.

(21) Appl. No.: 14/062,315

(22) Filed: Oct. 24, 2013

(65) Prior Publication Data

US 2015/0119189 A1    Apr. 30, 2015

(51) Int. Cl.
*B60K 1/02* (2006.01)
*B60W 20/00* (2006.01)
*B60W 10/06* (2006.01)
*B60W 10/08* (2006.01)

(52) U.S. Cl.
CPC .............. *B60W 20/40* (2013.01); *B60W 10/06* (2013.01); *B60W 10/08* (2013.01); *Y10S 903/902* (2013.01)

(58) Field of Classification Search
CPC ...... B60W 20/40; B60W 10/06; B60W 10/08
See application file for complete search history.

(56) References Cited

U.S. PATENT DOCUMENTS

| | | | |
|---|---|---|---|
| 6,654,677 B2 | 11/2003 | Weber et al. | |
| 7,797,089 B2 | 9/2010 | Kozarekar | |
| 7,878,282 B2 * | 2/2011 | Kumazaki | B60K 6/365 180/65.21 |
| 7,967,720 B2 | 6/2011 | Martin et al. | |
| 2008/0173485 A1 * | 7/2008 | Kumazaki | B60K 6/365 180/65.28 |
| 2009/0112439 A1 * | 4/2009 | Kuang | B60W 30/188 701/99 |
| 2012/0041630 A1 * | 2/2012 | Yamamoto | B60K 6/445 701/22 |
| 2012/0065828 A1 * | 3/2012 | Kato | B60K 6/445 701/22 |
| 2012/0072063 A1 * | 3/2012 | Kato | B60K 6/445 701/22 |
| 2012/0072066 A1 * | 3/2012 | Kato | B60K 6/365 701/22 |
| 2013/0024061 A1 | 1/2013 | Yagura et al. | |
| 2013/0066508 A1 | 3/2013 | Ueno et al. | |
| 2013/0197775 A1 | 8/2013 | Szwabowski et al. | |

FOREIGN PATENT DOCUMENTS

JP    2012086761    10/2012

* cited by examiner

*Primary Examiner* — David J Hlavka
(74) *Attorney, Agent, or Firm* — David B. Kelley; MacMillan, Sobanski & Todd, LLP

(57) ABSTRACT

A hybrid vehicle operates in an electric-drive-only mode and one or more modes using an internal combustion engine. A control pedal is movable to respective positions by a driver for indicating a desired vehicle motion. A controller selectably activates the engine according to instantaneous values of a variable wheel output demand and a variable pull-up threshold. The pedal position is converted to a respective instantaneous wheel output demand in response to an initial value from a mapping relationship that is modified in response to a difference between the initial value and the variable pull-up threshold. The pull-up threshold may preferably be dynamically determined according to a state of charge of a battery for powering the electric drive. The modification to the wheel output demand preferably reduces the slope of the mapping relationship near the pull-up threshold to reduce pedal position sensitivity in a region near the dynamically varying pull-up threshold.

19 Claims, 4 Drawing Sheets

US 9,162,674 B2

DYNAMIC MAPPING OF PEDAL POSITION TO WHEEL OUTPUT DEMAND IN A HYBRID VEHICLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to hybrid gas/electric vehicles, and, more specifically, to controlling the transition from electric-only mode to modes using the gas combustion engine in a manner that avoids premature or excessive switching to a gas engine mode.

A driver-controlled "accelerator" pedal is a common input device in all types of transportation vehicles such as gas-powered cars and trucks, electric vehicles, and hybrids. The pedal is typically operated by the driver's foot but may also be controlled by hand, for example. Historically, a pedal position corresponded directly to a position of a throttle supplying fuel and air to a combustion engine. In modern vehicles having electronic controls and additional types of powertrains, the relationship between the amount of pedal depression and the powertrain response can be tuned to provide different speed and torque responses.

An approach for adjusting a pedal position map is disclosed in U.S. Pat. No. 6,654,677 to Weber et al. A powertrain controller varies the mapping of an accelerator pedal position to an electronic throttle angle based on vehicle speed in order to improve operator control over vehicle speed, torque output, and acceleration. At lower vehicle speeds, the pedal position is mapped to the electronic throttle angle with a focus on providing acceleration control. At higher vehicle speeds, the pedal position is mapped to the electronic throttle angle with a focus on controlling vehicle speed.

The map between pedal position and wheel or engine output can be dynamically adjusted in response to additional variables. In U.S. application publication 2013/0197775A1, the relationship is adjusted based on road grade.

More generally, the mapping relationship varies the sensitivity of pedal position changes to corresponding changes in wheel/engine output. For example, the driver's perception of a vehicle's capability and responsiveness may be positively impacted by a pedal mapping with a steep slope, resulting in large changes in wheel power demands at relatively small accelerator pedal position changes. A pedal mapping with a small slope can provide a higher level of controllability, requiring larger changes in accelerator pedal position to realize a significant change to the driver demanded wheel power.

With the ever increasing need to produce vehicles that are more fuel efficient, hybrid electric vehicles (HEV's) have become popular because they provide an improvement in fuel economy over many conventional vehicles that utilize only an internal combustion engine to drive the vehicle. One of the primary advantages of an HEV is that it allows the vehicle to be powered by an electric motor under certain operating conditions. For example, when the wheel output demand is relatively moderate and the battery or other electrical power source is sufficiently charged, the engine may be shut off and the vehicle driven exclusively by one or more electric motors. As operating conditions change, the engine may be started to provide additional power.

With the HEV being driven in an electric-only mode, a control system determines when to start and stop the engine based on many inputs. For example, in a power-split or parallel hybrid one of the primary inputs is the driver demanded wheel power (based on a mapping of pedal position). When the wheel power demand exceeds a threshold known as the engine pull-up threshold, the engine is started to provide propulsion for the vehicle. Other inputs which may also be used to start the engine include the state of charge (SOC) of the high voltage battery, climate control demands for power or heat, or detected engine conditions in which continued operation is needed to maintain reduced emissions.

If an accelerator pedal mapping is too sensitive to small changes in accelerator pedal position, then small or inadvertent changes in accelerator pedal position may trigger an engine start while driving at a driver demand power that is near the engine pull-up threshold. In most circumstances it is beneficial to maximize the time spent in electric mode for improved efficiency and to improve owner satisfaction with the vehicle. Thus, it is desirable to provide controllability (less sensitivity) near the pull-up threshold, as has been suggested in U.S. patent publication 2013/0024061. In this publication, a mapping for suppressing engine activation can be selected using an ECO switch. However, the selected mapping is fixed and only functions with a fixed threshold for activating the engine.

It is advantageous to employ a dynamic pull-up threshold which can change based on many different conditions, including some which do not influence the accelerator pedal map such as the battery state of charge. The prior art has failed to accomplish both an optimum responsiveness and engine start controllability because of the static pull-up threshold and accelerator pedal mapping.

SUMMARY OF THE INVENTION

In one aspect of the invention, a hybrid vehicle comprises an electric drive and an internal combustion engine. A control pedal is movable to respective positions by a driver for indicating a desired vehicle motion. A controller selectably activates the engine according to instantaneous values of a variable wheel output demand and a variable pull-up threshold. The pedal position is converted to a respective instantaneous wheel output demand in response to an initial value from a mapping relationship that is modified in response to a difference between the initial value and the variable pull-up threshold. The pull-up threshold may preferably be dynamically determined according to various conditions such as a state of charge of a battery for powering the electric drive. The modification to the wheel output demand preferably reduces the slope of the mapping relationship near the pull-up threshold to reduce pedal position sensitivity in a dynamically-placed region near the dynamically varying pull-up threshold.

DETAILED DESCRIPTION OF PREFERRED EMBODIMENTS

Figure 1:
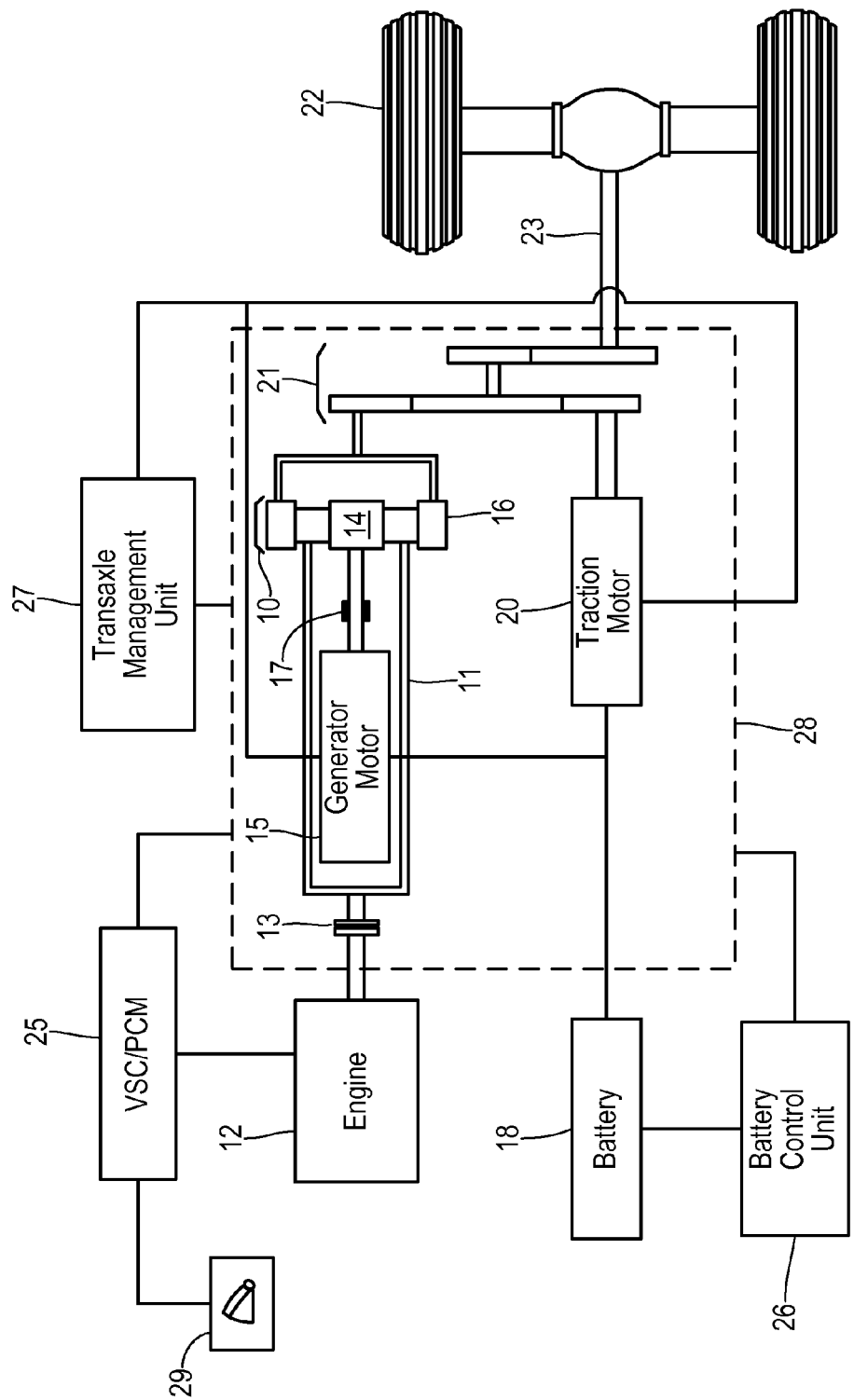
FIG. 1 is a block diagram showing a prior art hybrid system in which the present invention may be implemented.

The present invention is applicable to vehicles that include two or more different power source/drive combinations, such as hybrid electric vehicles (HEVs). FIG. 1 shows one configuration, which is a parallel/series hybrid electric vehicle (split) configuration. Various other hybrid configurations may also be used, such as series, parallel, integrated starter/alternator, etc.

In the HEV of FIG. 1, a planetary gear set 10 mechanically couples a carrier gear 11 to an engine 12 via a one way clutch 13. The planetary gear set 10 also mechanically couples a sun gear 14 to a generator motor 15 and a ring (output) gear 16. Generator motor 15 also mechanically links to a generator brake 17 and is electrically linked to a battery 18. A traction motor 20 is mechanically coupled to ring gear 16 of planetary gear set 10 via a second gear set 21 and is electrically linked to battery 18. Ring gear 16 of planetary gear set 10 and traction motor 20 are mechanically coupled to drive wheels 22 via an output shaft 23.

A vehicle system controller (VSC) and powertrain control module (PCM) 25 controls many components in this HEV configuration. The VSC and PCM functions may be integrated in one unit or may be performed in separate modules. VSC/PCM 25 communicates with a battery control unit 26 and a transaxle management unit 27 through a communication network such as a controller area network (CAN) 28. At low wheel output demand levels, VSC/PCM 25 operates the drive system in an electric-only mode with engine 12 deactivated. When wheel output demand as determined in response to the position of pedal 29 reaches a pull-up threshold, VSC/PCM 25 activates engine 12.

FIG. 1 demonstrates just one type of HEV configuration for purposes of explanation. Various vehicle types having other auxiliary power sources or other drive parallel and/or series drive combinations may be used. For example, the present invention is useful in a fuel cell HEV, a gasoline HEV, an ethanol HEV, a flex fuel HEV, or a hydrogen engine HEV. In each case, driver-controlled pedal 29 is coupled to VSC/PCM 25 in order to indicate a desired vehicle motion (i.e., whether in terms of desired speed or acceleration). More generally, the pedal position is converted as described below into a wheel output demand. The wheel output demand can be processed as a torque demand or, equivalently, as a power demand.

Figure 2:
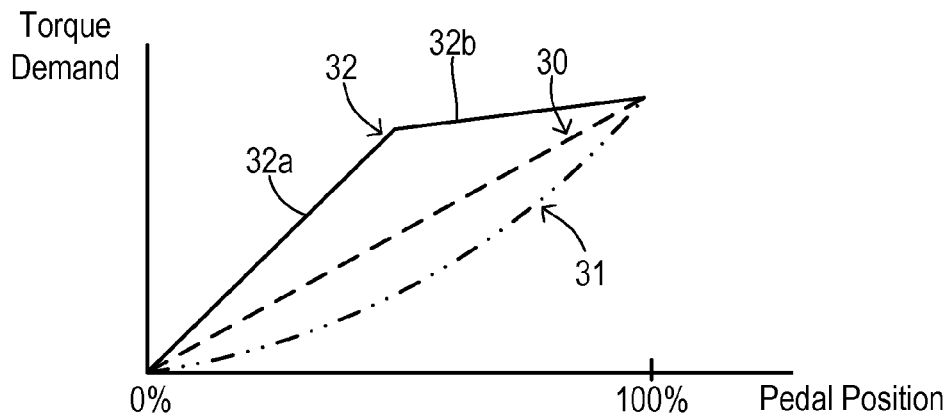
FIG. 2 is a graph showing prior art mappings between pedal position and a wheel torque demand.

FIG. 2 represents several different prior art pedal position mappings including a straight-line mapping 30 with a constant slope and a nonlinear mapping 31 with a variable slope. One example of an improved mapping 32 includes an increased slope section 32a and a decreased slope section 32b for better tuning the pedal performance to provide increased acceleration control at lower demands and increased speed control at higher demands.

Figure 3:
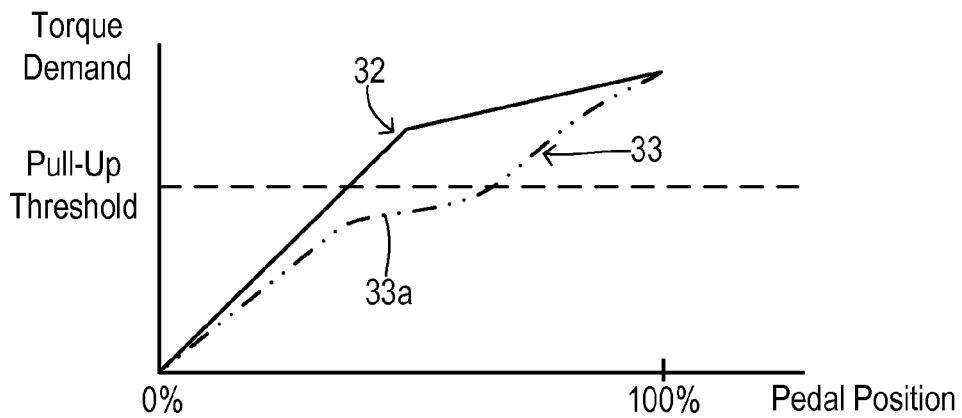
FIG. 3 is a graph showing a prior art adjustment to a pedal position mapping having a reduced slope near a fixed pull-up threshold.
Figure 4:
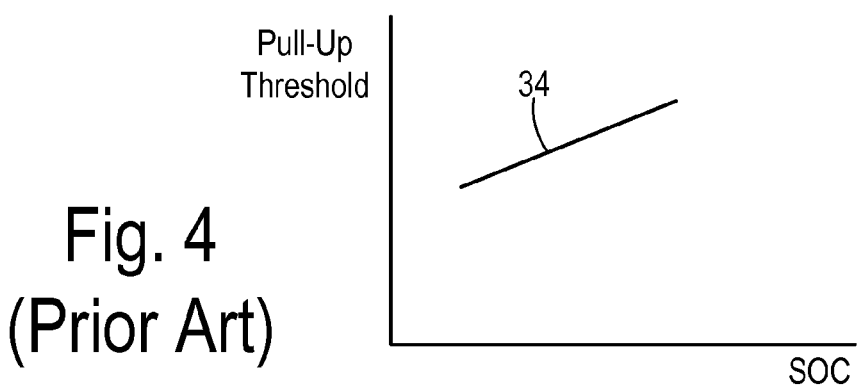
FIG. 4 is a graph showing one example of a dynamically variable pull-up threshold based on a varying state of change of a battery or other electrical storage device for powering an electric drive.

FIG. 3 shows a known modification to mapping 32 for use in a hybrid vehicle with a constant pull-up threshold. Mapping 33 includes a reduced slope region 33a for extending the pedal position at which mapping 33 crosses the pull-up threshold. A constant pull-up threshold, however, may be undesirable. Instead, a variable pull-up threshold 34 as shown in FIG. 4 may be implemented wherein the magnitude of the pull-up threshold depends on a battery SOC, power density capability, or other dynamic power limitations of the electric drive or power source. Therefore, the static mapping of the prior art fails to accommodate the use of a more desirable variable pull-up threshold.

Figure 5:
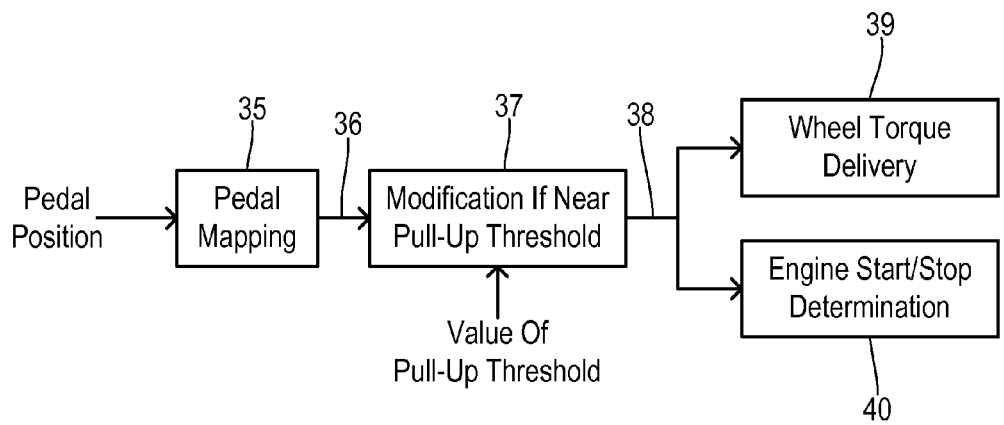
FIG. 5 is a block diagram showing one preferred embodiment of the invention for modifying a pedal position mapping as the pull-up threshold varies.

A first embodiment of the invention is shown in FIG. 5 wherein any desired conventional static or dynamic pedal mapping 35 converts a pedal position into an initial value 36. The conventional mapping may account for desired performance characteristics related to control sensitivity. Initial value 36 (i.e., the conventionally determined wheel torque demand) is compared with an instantaneous value of the engine pull-up threshold in a block 37 to determine a modified demand value 38 which may be used in determining a wheel torque delivery 39 and making an engine start/stop determination 40. Modified value 38 differs from initial value 36 by an amount determined according to the proximity of initial value 36 with the instantaneous value of the pull-up threshold.

Figure 6:
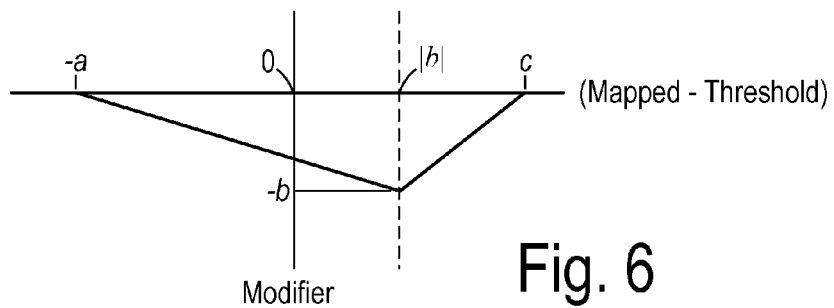
FIG. 6 is a plot showing one preferred embodiment of a function for defining a modification value near the pull-up threshold.

FIG. 6 represents a preferred function for deriving a modification based on the difference between the initial value of the wheel output demand and the dynamic value of the pull-up threshold. The x-axis represents a difference ($\Delta$) formed by subtracting the pull-up threshold from the initial value of the mapped pedal position. The y-axis represents the modification to be applied to the initial value. Outside of a range of $\Delta$ extending from a lower bound at a magnitude of $-a$ to an upper bound having a value c, the modification has a value of zero. In this way, the initial demand value is only modified when it is near the dynamic value of the pull-up threshold. The modification is always negative within the range between $-a$ and c and has a maximum value of $-b$. In this preferred embodiment, the function for defining the modification is a straight line having a predetermined first slope between the lower bound and the maximum value and a straight line having a second predetermined slope between the maximum value and the upper bound. The first slope is less steep than the second slope (i.e., the absolute value of the first slope is less than the absolute value of the second slope). The net effect of the first slope is to reduce pedal sensitivity when nearing the pull-up threshold in a manner that tracks the variation of the pull-up threshold. The second slope restores the pedal mapping to its unmodified values after exceeding the pull-up threshold by an additional amount. In an alternative embodiment, the shape of the function between the upper or lower bound and the maximum value may be other than straight lines.

As a result of the modification defined by FIG. 6, the engine start will occur when $\Delta$ (the initial mapped demand minus the pull-up threshold) is equal to $|b|$. To ensure that the modified values are less sensitive below the threshold, the minimum value of $-b$ should not occur before the point when $\Delta=b$. Stated differently, the maximum modification should occur when the function shown in FIG. 6 crosses a line defined by $(y=-x)$.

In yet other embodiments, it may be desirable to use a different modification after the engine has been started. For example, a method can be used which stops using the lookup function and instead decreases the last-used modification value to zero linearly over time, or linearly over change in pedal position or torque demand. Another alternative method would continue to look up values from the table, but only update the actively-used value if the new value is smaller than the active value. Consequently, as demand increases above c, the value would reduce to zero and then remain zero for as long as the engine remains on (even if the demand drops back below c). If the demand did not increase above c, there would continue to be a constant modification while the engine runs.

Figure 7:
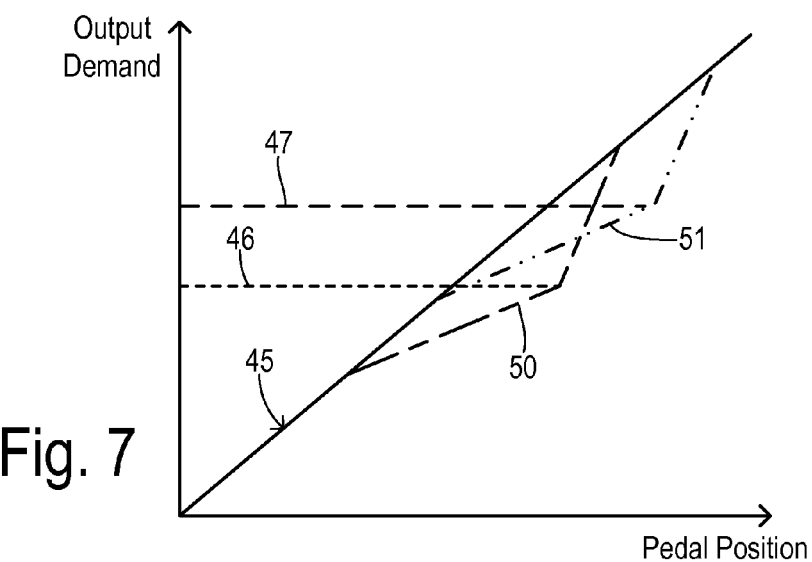
FIG. 7 is a graph representing different modifications made to a pedal position mapping for different pull-up thresholds.

FIG. 7 illustrates the effect of the dynamic modification on the final pedal demand mapping when using the relationship defined in FIG. 6. A solid line 45 represents an initial pedal mapping that may be determined on any desired basis in order to tune vehicle performance without regard to its effect on the pull-up threshold for an HEV (represented as a straight line for simplicity). Dashed line 46 represents a first value of a dynamic pull-up threshold in effect at one moment in time and dashed line 47 represents a second value of the pull-up threshold at a different moment in time. When the pull-up threshold has the value shown by line 46, mapping 45 is modified to provide a mapping that follows a dashed line 50 resulting in an increase in the required pedal position for reaching the pull-up threshold. When pull-up threshold value 47 is being used, the modified pedal mapping instead follows a dashed line 51 so that activation of the combustion engine is delayed by a similar amount of pedal movement even though the pull-up threshold has changed. In other words, as the wheel torque demand approaches the pull-up threshold, the wheel torque demand is decreased to produce a smaller slope in the accelerator pedal position-output demand relationship thereby requiring a larger change in pedal position to reach the pull-up threshold. The actual amount of additional accelerator pedal position increase needed to start the combustion engine is controlled by the value of b and the initial pedal mapping. The slope of the changes and the size of the region being modified depend on the values of a and c. Since the modification is made relative to the engine pull-up threshold value, the accelerator pedal mapping changes dynamically along with the dynamic changes to the pull-up threshold.

Figure 8:
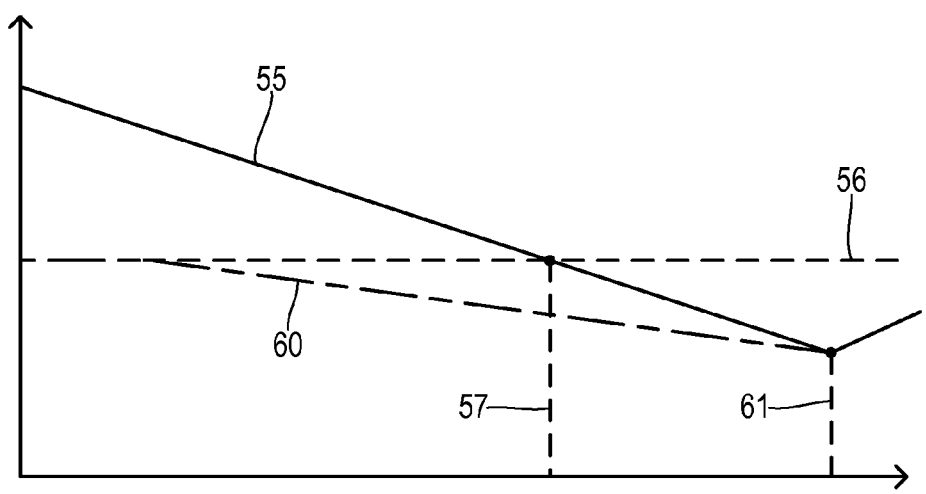
FIG. 8 is a graph showing the effect of a changing battery state of charge on the pull-up threshold and mapping modification when the pedal position is being held substantially constant.

As the pull-up threshold dynamically changes during driving in the electric-only mode, the modification made by the present invention will change the value for the driver torque demand even while the accelerator pedal position is being held constant (e.g., during highway driving with automatic speed control engaged). For example, FIG. 8 corresponds to an accelerator pedal position being held constant at a torque demand which is below an initial pull-up threshold. Solid line 55 represents the pull-up threshold dropping over time, and dashed line 56 represents a constant (unmodified) wheel output demand according to the constant pedal position. The pull-up threshold may drop as a result of extended operation in electric mode as the battery state of charge is depleted. As engine pull-up threshold 55 approaches unmodified demand 56, the combustion engine would be started by a prior art system at a time 57. Solid line 60 represents the dynamically adjusted wheel output demand incorporating the modifier of the invention. As the mapped wheel output demand becomes closer to the decreasing pull-up threshold, the modification kicks in so that the modified value of the mapped demand increasingly drops over time. The modified torque demand remains below the pull-up threshold until the maximum torque modification is reached at a time 61. Without the torque modification either the engine would start earlier, or the driver would need to actively reduce their accelerator pedal position to avoid the starting of the engine.

What is claimed is:

1. A hybrid vehicle comprising:
an electric drive;
an internal combustion engine;
a control pedal movable to respective positions by a driver for indicating a desired vehicle motion;
a controller selectably activating the engine according to a wheel output demand and a variable pull-up threshold, wherein the pedal position is converted to a respective instantaneous wheel output demand in response to an initial value from a mapping relationship modified in response to a difference between the initial value and the variable pull-up threshold.

2. The vehicle of claim 1 wherein the electric drive includes an electric power source, and wherein the controller determines a value for the variable pull-up threshold according to a dynamic power limitation of the power source.

3. The vehicle of claim 1 wherein a modification of the mapping relationship has a slope for providing a maximum value when the variable pull-up threshold is reached.

4. The vehicle of claim 1 wherein the modification of the mapping relationship has a zero value when the difference between the initial value and the variable pull-up threshold is outside a range extending from a lower bound to an upper bound, and wherein the variable pull-up threshold is between the lower and upper bounds.

5. The vehicle of claim 4 wherein a modification of the mapping relationship has a maximum value when the variable pull-up threshold is reached, and wherein the modification has an intermediate value defined by a function having a first slope between the lower bound and the maximum value and having a second slope between the maximum value and the upper bound.

6. The vehicle of claim 5 wherein an absolute value of the first slope is less than an absolute value of the second slope.

7. The vehicle of claim 1 wherein the desired vehicle motion corresponds to a desired torque, wherein the respective instantaneous wheel output demand is converted as a wheel output torque, and wherein the pull-up threshold is a torque threshold.

8. The vehicle of claim 1 wherein the desired vehicle motion corresponds to a desired power, wherein the respective instantaneous wheel output demand is converted as a wheel output power, and wherein the pull-up threshold is a power threshold.

9. The vehicle of claim 1 wherein after the engine has been activated above the pull-up threshold then the controller converts the pedal position to a wheel output demand without any modification based on the difference between the initial value and the variable pull-up threshold.

10. A method of operating a hybrid vehicle comprising:
moving the vehicle with an electric drive system and with a combustion engine deactivated;
determining an dynamic engine pull-up threshold based on a state of the drive system;
mapping a driver pedal position to a demand using a predetermined mapping with a dynamically reduced slope immediately below the pull-up threshold; and
activating the engine when the demand is greater than the pull-up threshold.

11. A method of operating a hybrid vehicle having an electric drive and an internal combustion engine, comprising the steps of:
sensing a position of a control pedal that is configured to be movable by a driver for indicating a desired vehicle motion;
determining an instantaneous value for a variable pull-up threshold for defining a wheel output demand during operation of the electric drive without the engine at which the engine should be activated;

converting the sensed pedal position to a respective instantaneous wheel output demand in response to an initial value determined from a predetermined mapping relationship of the pedal position to the wheel output demand, wherein the initial value is modified in response to a difference between the initial value and the instantaneous value for the variable pull-up threshold to generate the instantaneous wheel output demand; and selectably activating the engine when the modified initial value reaches the instantaneous value for variable pull-up threshold.

12. The method of claim 11 wherein the electric drive includes a battery, and wherein the instantaneous value for the variable pull-up threshold is determined according to a state of charge of the battery.

13. The method of claim 11 wherein the electric drive includes an electric power source, and wherein the instantaneous value for the variable pull-up threshold is determined according to a dynamic power limitation of the electric power source.

14. The method of claim 11 wherein the modification of the mapping relationship has a slope for providing a maximum value when the variable pull-up threshold is reached.

15. The method of claim 11 wherein the modification of the mapping relationship has a zero value when the difference between the initial value and the variable pull-up threshold is outside a range extending from a lower bound to an upper bound, and wherein the variable pull-up threshold is between the lower and upper bounds.

16. The method of claim 15 wherein a modification of the mapping relationship has a maximum value when the variable pull-up threshold is reached, and wherein the modification has an intermediate value defined by a function having a first slope between the lower bound and the maximum value and having a second slope between the maximum value and the upper bound.

17. The method of claim 16 wherein an absolute value of the first slope is less than an absolute value of the second slope.

18. The method of claim 11 wherein the desired vehicle motion corresponds to a desired torque, wherein the respective instantaneous wheel output demand is converted as a wheel output torque, and wherein the pull-up threshold is a torque threshold.

19. The method of claim 11 wherein the desired vehicle motion corresponds to a desired power, wherein the respective instantaneous wheel output demand is converted as a wheel output power, and wherein the pull-up threshold is a power threshold.

* * * * *